May 28, 1968  D. R. SCOTT  3,384,909
APPARATUS CONTROL SYSTEM AND METHOD OF OPERATING THE SAME
Filed Nov. 8, 1966
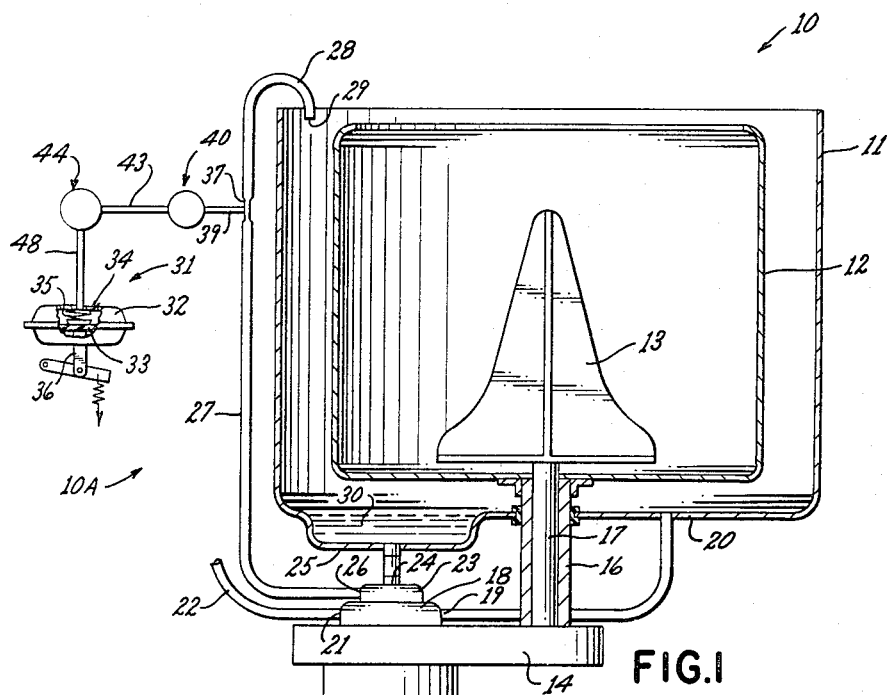
FIG.1
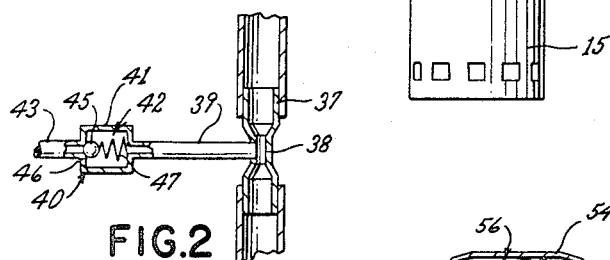
FIG.2
FIG.4
FIG.3
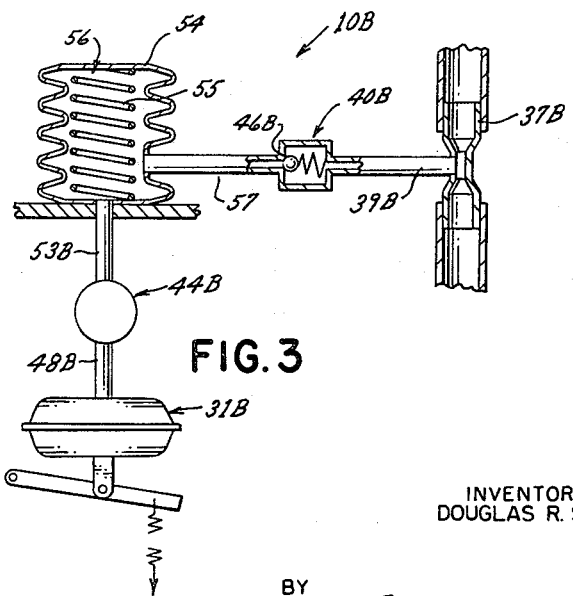
INVENTOR
DOUGLAS R. SCOTT
BY
HIS ATTORNEYS United States Patent Office 3,384,909
Patented May 28, 1968

3,384,909
APPARATUS CONTROL SYSTEM AND METHOD
OF OPERATING THE SAME
Douglas R. Scott, Greensburg, Pa., assignor to Robertshaw Controls Company, Richmond, Va., a corporation of Delaware
Filed Nov. 8, 1966, Ser. No. 592,840
20 Claims. (Cl. 8—158)

ABSTRACT OF THE DISCLOSURE

This disclosure relates to a control system for a washing apparatus that has the cycle of operation thereof controlled by vacuum operated actuators, the apparatus having a sump chamber for containing a supply of water that is pumped through a passage means having an aspirator therein whereby the flow of water from the sump chamber through the aspirator will create the vacuum source that is utilized in a sequential manner to operate the vacuum operated actuators.

---

This invention relates to an improved control system for an apparatus having fluidically operated actuator means as well as to an improved method for operating such an apparatus or the like and to improved parts for such an apparatus or the like.

It is well known from the disclosure of the U.S. Patent to Scott et al., No. 3,177,898, that a control system can be provided for a washing apparatus or the like, such as a domestic laundry washing machine or dishwasher, wherein the cycle of operation of the apparatus is automatically controlled by a program means that interconnects a source of actuating fluid to various fluidically actuated actuator means in a predetermined sequence to automatically control such apparatus throughout its entire cycle of operation as selected by the housewife when setting the program means at a desired starting position thereof and, thereafter, actuating a starting mechanism.

However, when such fluidically operated system as set forth in the aforementioned patent is utilized, the source of actuating fluid is created by a vacuum pump that is electromagnetically driven for continuous operation thereof when an on-off member of the control system is moved to its on position whereby the program means will thereafter automatically control the cycle of operation of the apparatus throughout a particular cycle previously selected by the housewife or the like.

It is a feature of this invention to provide an improvement in such previously described control system wherein such electromagnetically operated fluid pump means can be eliminated and the apparatus itself can provide the source of actuating fluid so that such actuating fluid can be utilized to control the entire cycle of operation thereof in the above manner.

In this manner, not only are fewer moving parts required by the control system of this invention, but also less electrical wire harness means and electrical switches are required as will be apparent hereinafter.

In one embodiment of this invention, once the apparatus is turned on for a cycle of operation thereof, the apparatus itself will continuously create a flow of a first fluid which, in turn, will create a source of actuating fluid that can be utilized for operating the fluidically operated actuator means of the apparatus for controlling the entire desired cycle of operation thereof.

For example, in a washing apparatus, such as a dishwasher or a laundry machine, a sump means is provided by this invention for containing a supply of water which will be continuously moved through a passage means during the operation of the apparatus whereby that flow of water will create a vacuum in the system which can be utilized to operate the fluidically operated actuator means thereof.

Accordingly, it is an object for this invention to provide an improved control system for an apparatus having fluidically operated actuator means or the like, the system of this invention having one or more of the novel features set forth above or hereinafter shown or described.

Another object of this invention is to provide an improved method for operating such an apparatus or the like.

A further object of this invention is to provide an improved apparatus having one or more of the novel features set above or hereinafter described.

Another object of this invention is to provide an improved method for making such an apparatus or the like.

Other objects, uses and advantages of this invention are apparent from a reading of this description which proceeds with reference to the accompanying drawings forming a part thereof and wherein:

FIGURE 1 is a schematic cross-sectional view illustrating the improved control system and apparatus of this invention.

FIGURE 2 is an enlarged, fragmentary, cross-sectional view illustrating the vacuum creating means of the apparatus of FIGURE 1.

FIGURE 3 is a view similar to FIGURE 2 and illustrates another embodiment of this invention.

FIGURE 4 is a schematic, fragmentary view illustrating the program means for the apparatus of FIGURE 1.

While the various features of this invention are hereinafter described and illustrated as being particularly adaptable for providing a control system for a laundry washing machine or the like, it is to be understood that the various features of this invention can be utilized singly or in any combination thereof to provide control means for other types of apparatus as desired.

Therefore, this invention is not to be limited to any of the embodiments illustrated in the drawings, because the drawings are merely utilized to illustrate some of the wide variety of uses of this invention.

Referring now to FIGURE 1, the improved method and apparatus of this invention is generally indicated by the reference numeral 10 and the control system of this invention utilized for controlling the operation of the apparatus 10 is generally indicated by the reference numeral 10A, the apparatus 10 comprising a conventional laundry washing machine having a stationary tub or confining means 11 rotatably carrying a washing compartment means 12 and an agitator 13 disposed in the washing compartment means 12.

The washing compartment means 12 is adapted to be rotated relative to the stationary tub 11 by a conventional transmission means 14 operatively interconnected to the output means of an electrical motor means 15 and to the compartment 12 by a shaft means 16. Similarly, the transmission means 14 is adapted to be interconnected to the agitator 13 by a shaft means 17.

The motor 15 is adapted to drive a conventional drain pump 18 having its inlet 19 interconnected to the interior of the stationary tub 11 at the bottom wall 20 thereof whereby the outlet 21 of the drain pump 19 can be interconnected to a conduit means 22 leading to a suitable drain or the like.

An auxiliary pump means 23 is also provided and is adapted to be driven by the electrical motor 15 in any suitable manner, the auxiliary pump 23 having its inlet 24 interconnected to a sump portion 24 formed in the bottom wall means 20 of the stationary tub 11 for a purpose hereinafter described.

The outlet 26 of the auxiliary pump 23 is interconnected to a passage means or conduit 27 which has its upper end 28 so constructed and arranged that the outlet 29 of the conduit means 27 is directed into the tub 11 for a purpose hereinafter described.

The transmission means 14 and motor means 15 of the apparatus 10 are so constructed and arranged that when the apparatus 10 is turned on to produce a washing cycle or the like, the motor means 15 continuously runs during the entire cycle of operation of the apparatus 10 to continuously operate the auxiliary pump 23 for a purpose hereinafter described. However, the transmission means 14 is so constructed and arranged that the same will not effectively interconnect the output means of the electrical motor 15 to the shaft means 16 of the tub 12 or to the shaft means 17 of the agitator 13 until the program means of the apparatus 10 determines that the washing compartment 12 should be spun for a centrifuging operation thereof or that the agitator 13 should be moved for agitation purposes. Similarly, the motor means 15 will not drive the drain pump 18 until such program means determines that the drain pump means 18 should be operated.

Therefore, it can be seen that during the entire cycle of operation of the apparatus 10, a certain amount or supply 30 of water will remain in the sump means 25 as the level of the water 30 in the sump means 25 is below the normal level of the bottom wall 20 of the stationary tub 11 and will not be emptied by the drain pump 18 during operation of the drain pump 18.

However, because the auxiliary pump 23 is continuously operated by the motor means 15 during the entire cycle of operation of the apparatus 10, the pump means 23 will draw water from the sump means 25 and force the same through the conduit means or passage means 27 to the outlet end 29 thereof whereby such pumped flow of water will return to the sump means 25 for continuous recirculation thereof through the auxiliary pump 23. In this manner, a continuous flow of water will be provided through the passage means 27 during substantially the entire cycle of operation of the apparatus 10 because should the sump means 25 be initially empty, the first operation of the apparatus 10 is to direct wash water therein whereby the sump means 25 will be immediately filled.

This continuous flow of water through the conduit means 27 during the entire operation of the apparatus 10 provides means for creating a source of actuating fluid to be utilized to actuate a plurality of fluidically operated actuator means 31 of the apparatus 10 whereby such actuator means 31 can control various electrical switches, the transmission means 14 and the like to provide various operations of the apparatus 10 during the cycle of operation thereof.

For example, each actuator means 31 can comprise a rigid housing means 32 carying a flexible diaphragm 33 which cooperates therewith to define a chamber 34. The diaphragm 33 is normally urged to the non-actuated position thereof illustrated in FIGURE 1 by a suitable compression spring 35 disposed in the chamber 34 whereby the diaphragm 33 normally holds an actuating post means 36 in a particular position thereof. However, when the chamber 34 is evacuated in a manner hereinafter described, the pressure differential across the diaphragm 33 causes the diaphragm 33 to move upwardly in FIGURE 1 and carry the post means 36 therewith whereby such movement of the post means 36 can control a particular device of the apparatus 10 to produce an operating function thereof, such as closing an electrical switch or the like.

As previously stated, the continuous flow of water through the passage means 27 of the apparatus 10 during the entire cycle of operation thereof is utilized to create a source of actuating fluid for the actuator means 31. In the embodiment illustrated in FIGURES 1 and 2, the passage means 27 includes an aspirator or venturi member 37 disposed in the flow path of the water through the passage means 27 whereby the water pumped therethrough must pass through the throat portion 38 of the venturi member 37 and will cause a suction to be created in a conduit means 39 fluidly interconnected to the throat portion 38 of the venturi member 37.

The conduit means 39 can have a one-way check valve means 40 disposed therein with the check valve means 40 comprising a housing 41 defining a chamber 42 fluidly interconnected to the conduit 39 and to another conduit 43 leading to selector means or program means 44 later described. However, a ball valve member 45 is disposed in the chamber 42 of the housing 41 and is normally urged against a valve seat 46 interconnecting the conduit 43 with the chamber 42 by a compression spring 47 to prevent fluid communication between the conduit means 39 and 43.

However, when the flow of water through the passage means 27 is being provided by the auxiliary pump 23, such flow of water through the throat portion 38 of the venturi member 37 creates a vacuum in the conduit 39 which causes the ball valve 45 to unseat from the valve seat 46 so that the venturi member 37 will also create a vacuum in the conduit means 43 as well as in the chamber 34 of an actuator means 31 when the program means or selector means 44 interconnects the conduit 43 with a conduit 48 leading to the particular chamber 34 of an actuator 31 in a manner now to be described.

While the program means or selector means 44 can be constructed in any suitable manner to provide the aforementioned valving function, the embodiment thereof illustrated in the drawings is of substantially the same type as disclosed in the U.S. patent to Mansell, No. 3,123,-976, to be utilized for sequential and automatic control of the apparatus 10 in the manner disclosed and described in the aforementioned U.S. Patent to Scott et al., No. 3,177,898.

For example, such program means 44 is schematically illustrated in FIGURE 4 and includes a stationary reading head 49 having the reading surface thereof interrupted by a plurality of port means, such as port means 50 and 51, with the port means 50 being interconnected to the conduit 48 and the port means 51 being interconnected to the conduit 43 leading to the vacuum creating means 37. A flexible reading sheet or program member 52 is adapted to have its under surface moved relative to and in sealing engagement with the reading surface of the reading head 49 by a suitable timer motor or the like with the reading sheet 52 having a plurality of blister-like channel means 53 formed in the reading side thereof in a predetermined pattern so that as the program member 52 moves relative to the reading head 49 the channel means 53 are adapted to bridge two or more port means in the reading head 49 to fluidly interconnect the same together. For example, as illustrated in FIGURE 4, the blister means 53 bridges the port means 50 and 51 in a predetermined portion of the cycle of operation of the apparatus 10 to interconnect the vacuum source means 37 to the chamber 34 of the actuator 31 to cause evacuation of the chamber 34 for the previously described purpose.

Therefore, by constructing the program member 52 in a predetermined manner, the program member 52 will automatically control the cycle of operation of the apparatus 10 when the same is first turned on by the housewife or the like and, once the apparatus 10 is turned on, the auxiliary pump means 23 will be continuously operating to provide a flow of water through the venturi means 37 so that a vacuum source is continuously being created by the system 10A of this invention to be utilized as an actuating fluid for the various fluidically operated actuator means 31 of the apparatus 10 in a predetermined and automatic manner provided by the program means 44.

Accordingly, it can be seen that the sump means 25 of the apparatus 10 of this invention is utilized in such a manner that the control system 10A of this invention is adapted to continuously create a flow of fluid through the conduit means 27 to continuously create a source of actuating fluid to be utilized by the selector means or program means 44 for controlling the fluidically operated actuator means of the apparatus 10 without requiring the electromagnetically driven fluid pump means of the systems disclosed in the aforementioned two U.S. patents.

Should it be found that a large supply of actuating fluid is needed at one time or that it is not desired to have the auxiliary pump 23 continuously operating during the entire cycle of operation of the apparatus 10 even though actuators are to be subsequently actuated, an accumulator means or vacuum storage means can be provided in the system 10A of this invention, if desired.

For example, such embodiment is illustrated in FIGURE 3 and parts of the system 10A previously described are indicated by like reference numerals followed by the reference letter "B."

As illustrated in FIGURE 3, the system 10B is substantially identical to the system 10A previously described except that an accumulator or vacuum storage means 54 is disposed intermediate the one-way check valve means 40B and the selector or program means 44B previously described. In particular, the accumulator 54 comprises a collapsible bellows structure normally urged to its expanded position by an internally disposed compression spring 55 to maintain the volume of the chamber 56 therein at its maximum condition. The chamber 56 is fluidly interconnected to the valve seat 46B of the one-way check valve means 40B by a conduit means 57 and is fluidly interconnected to the port means of the reading head of the selector valve means 44B by the previously described conduit means 53B.

Thus, when a flow of water is created through the venturi member 37B of the system 10B in the manner previously described, such vacuum being drawn on the conduit 39B opens the one-way check valve means 40B to evacuate the conduit 57 and, thus, the chamber 56 of the bellows construction 54 whereby the bellows construction 54 is collapsed against the force of the compression spring 55. Subsequently, when the flow of water through the venturi member 37B is terminated, the check valve means 40B closes and as long as the selector means 44B is not interconnected in the chamber 56 of the accumulator 54 with an actuator means 31B, the bellows construction 54 remains in its collapsed position. However, when the selector means 44B fluidly interconnects the conduit 53B with the conduit 48B leading to an actuator means 31B, the bellows 54 tends to expand and draws a vacuum in the chamber of the particular actuator means 31B to operate the same in the manner previously described. Thus, it can be seen that the accumulator 54 can have its chamber evacuated by the venturi member 37B of this invention so that the collapsed accumulator 54 can be subsequently utilized to operate the fluidically operated actuator means of the apparatus even though the flow of water through the venturi means 37B has been terminated.

Also, it can be seen that the system 10B could be utilized even though the water is being continuously forced through the venturi member 37B during the entire cycle of operation of the apparatus with the accumulator means 54 merely being provided to permit a greater number of actuator means 31B to be actuated at the same time and also to provide a more constant source of actuating fluid for the actuator means.

However, it can be seen that regardless of which system 10A or 10B is utilized, the apparatus itself provides its own source of actuating fluid without requiring the previously described electromagnetically operated fluid pump means.

Therefore, it can be seen that this invention not only provides an improved control system for an apparatus having fluidically operated actuator means, but also this invention provides an improved method for operating the same.

In addition, this invention provides an improved apparatus as well as an improved method for making such an apparatus or the like.

While the form of the invention now preferred has been disclosed as required by the statutes, other forms may be used, all coming within the scope of the claims which follow.

What is claimed is:

1. In a control system for an apparatus having fluidically operated actuator means, a source of a first fluid, means for causing a flow of said first fluid during the entire cycle of operation of said apparatus, means defining passage means for said flow of said first fluid from said source through said passage means and back to said source thereof to again be circulated through said passage means, said passage means having means for creating a source of actuating fluid as said first fluid flows in a recirculating manner through said passage means, and means for interconnecting said source of actuating fluid to said actuator means to actuate the same.

2. In a control system for an apparatus having fluidically operated actuator means, means for causing a flow of a first fluid during the entire cycle of operation of said apparatus, means defining passage means for said flow of said first fluid, said passage means having means for creating a source of actuating fluid as said first fluid flows through said passage means, and means for interconnecting said source of actuating fluid to said actuator means to actuate the same, said passage means comprising a sump means in said apparatus for containing a supply of water whereby said water defines said first fluid.

3. In a control system as set forth in claim 2, said means for causing said flow of said first fluid comprises a pump means for pumping said water from said sump means through said passage means.

4. In a control system as set forth in claim 3, said passage means being so constructed and arranged that the same returns said water passing therethrough back to said sump means.

5. In a control system as set forth in claim 3, said apparatus having motor means for driving a spin and/or agitation transmission means of said apparatus, said motor means continuously driving said pump means during the entire cycle of operation of said apparatus.

6. In a control system as set forth in claim 2, said means for creating said source of actuating fluid comprises an aspirator means disposed in said passage means and through which said water flows whereby said aspirator provides a vacuum as said actuating fluid.

7. In a washing apparatus or the like having fluidically operated actuator means, the improvement comprising a sump means carried by said apparatus for containing a supply of water, passage means carried by said apparatus, pump means carried by said apparatus for pumping said water from said sump means through said passage means, an aspirator means disposed in said passage means for creating a source of vacuum as said water is pumped therethrough, and means for interconnecting said vacuum source to said actuator means for imposing a vacuum thereon.

8. In a washing apparatus as set forth in claim 7, a vacuum storage means disposed between said aspirator means and said actuator means and being in fluid communication therewith.

9. In a washing apparatus as set forth in claim 8, selector means disposed between said storage means and said actuator means for selectively interconnecting said storage means with said actuator means.

10. In a washing apparatus as set forth in claim 7, said means for interconnecting said vacuum source to said actuator means includes a program means for automatically interconnecting said vacuum source to said actuator means in a predetermined pattern.

11. A method of controlling the operation of an apparatus having fluidically operated actuator means comprising the steps of providing a source of a first fluid, causing a flow of said first fluid during the entire cycle of operation of said apparatus, providing a passage means through which said first fluid flows from said source through said passage means and back to said source thereof to again be circulated through said passage means, creating a source of actuating fluid from the recirculating flow of said first fluid through said passage means, and interconnecting said source of actuating fluid to said actuator means to actuate the same.

12. A method of controlling the operation of an apparatus having fluidically operated actuator means comprising the steps of causing a flow of a first fluid during the entire cycle of operation of said apparatus, providing a passage means through which said first fluid flows, creating a source of actuating fluid from the flow of said first fluid through said passage means, interconnecting said source of actuating fluid to said actuator means to actuate the same, and providing a sump means in said apparatus for containing a supply of water to form said first fluid.

13. A method as set forth in claim 12 wherein the step of causing said flow of said first fluid includes the step of pumping said water from said sump means through said passage means with a pump means.

14. A method as set forth in claim 13 and including the step of directing the flow of said first fluid through said passage means back to said sump means.

15. A method as set forth in claim 13 and including the step of driving said pump means with a motor means of said apparatus during the entire cycle of operation of said apparatus, and utilizing said motor means to drive a spin and/or agitation transmission means of said apparatus.

16. A method as set forth in claim 12 wherein the step of creating said source of actuating fluid includes the steps of disposing an aspirator means in said passage means and causing said water in said passage means to flow through said aspirator means to provide a vacuum that forms said actuating fluid.

17. A method for controlling the operation of a washing apparatus or the like having fluidically operated actuator means comprising the steps of providing a sump means in said apparatus for containing a supply of water, providing passage means for said apparatus, pumping said water from said sump means through said passage means, disposing an aspirator means in said passage means for creating a source of vacuum as said water is pumped therethrough, and interconnecting said vacuum source to said actuator means for imposing a vacuum thereon.

18. A method as set forth in claim 17 and including the step of disposing a vacuum storage means between said aspirator means and said actuator means with said storage means being in fluid communication therewith.

19. A method as set forth in claim 18 wherein said step of interconnecting said vacuum source with said actuator means includes the steps of disposing selector means between storage means and said actuator means for selectively interconnecting said storage means with said actuator means.

20. A method as set forth in claim 17 wherein said step of interconnecting said vacuum source to said actuator means includes the step of interconnecting said vacuum source to said actuator means with a program means that automatically interconnects said vacuum source to said actuator means in a predetermined pattern.

References Cited
UNITED STATES PATENTS 2,780,066   2/1957   Tarry _____ 60—60
3,112,630   12/1963   Anderson et al. _____ 68—12

WILLIAM I. PRICE, *Primary Examiner.*